US009639761B2

(12) United States Patent
Mansour et al.

(10) Patent No.: US 9,639,761 B2
(45) Date of Patent: May 2, 2017

(54) METHOD FOR EXTRACTING LOW-RANK DESCRIPTORS FROM IMAGES AND VIDEOS FOR QUERYING, CLASSIFICATION, AND OBJECT DETECTION

(71) Applicant: Mitsubishi Electric Research Laboratories, Inc., Cambridge, MA (US)

(72) Inventors: Hassan Mansour, Boston, MA (US); Shantanu Rane, Cambridge, MA (US); Petros T. Boufounos, Boston, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 527 days.

(21) Appl. No.: 14/202,327

(22) Filed: Mar. 10, 2014

(65) Prior Publication Data
US 2015/0254513 A1   Sep. 10, 2015

(51) Int. Cl.
*G06K 9/46* (2006.01)
*G06K 9/00* (2006.01)
(Continued)

(52) U.S. Cl.
CPC ... *G06K 9/00744* (2013.01); *G06F 17/30781* (2013.01); *G06F 17/30784* (2013.01);
(Continued)

(58) Field of Classification Search
CPC ........... G06K 9/00711; G06K 9/00744; G06K 9/00751; G06K 9/00758; G06K 9/38;
(Continued)

(56) References Cited

U.S. PATENT DOCUMENTS 5,748,775 A * 5/1998 Tsuchikawa ....... G06K 9/00369
382/190
6,751,354 B2 * 6/2004 Foote ................. G06K 9/00758
382/224
(Continued)

FOREIGN PATENT DOCUMENTS

WO    2004040480 A1    5/2004
WO    2008106506 A2    9/2008

OTHER PUBLICATIONS

I-Hong Jhuo, Dong Liu, D.T. Lee, Shih-Fu Chang, "Robust Visual Domain Adaptation with Low-Rank Reconstruction", IEEE, Conference on Computer Vision and Pattern Recognition, Jun. 2012, pp. 2168-2175.*

(Continued)

*Primary Examiner* — Eric Rush
(74) *Attorney, Agent, or Firm* — Gene Vinokur; James McAleenan; Hironori Tsukamoto

(57) ABSTRACT

A method extracts a low-rank descriptor of a video acquired of a scene by first extracting a set of descriptors for each image in the video. The sets of descriptors for the video are aggregated to form a descriptor matrix. Iteratively, a low-rank descriptor matrix is determined from the descriptor matrix, as well as a selection matrix that associates each column in the descriptor matrix to a corresponding column in the low-rank descriptor matrix. The low-rank descriptor matrix is output upon convergence.

10 Claims, 4 Drawing Sheets

(51) Int. Cl.
*G06F 17/30* (2006.01)
*G06K 9/64* (2006.01)
*G06K 9/62* (2006.01)

(52) U.S. Cl.
CPC .... *G06F 17/30799* (2013.01); *G06K 9/00711* (2013.01); *G06K 9/00751* (2013.01); *G06K 9/00758* (2013.01); *G06K 9/46* (2013.01); *G06K 9/6247* (2013.01); *G06K 9/64* (2013.01); *G06K 2009/4695* (2013.01)

(58) Field of Classification Search
CPC ...... G06K 9/46; G06K 9/4671; G06K 9/4676; G06K 9/6201; G06K 9/6214; G06K 9/6215; G06K 9/64; G06K 9/66; G06K 2009/4695; G06F 17/30781; G06F 17/30784; G06F 17/3079; G06F 17/30793; G06F 17/30799; G06F 17/30823; G06F 17/30825; G06F 17/30858
USPC ....... 382/100, 155, 159, 160, 181, 190, 224, 382/278
See application file for complete search history.

(56) References Cited

U.S. PATENT DOCUMENTS

| | | | |
|---|---|---|---|
| 7,143,352 B2 | 11/2006 | Divakaran et al. | |
| 7,340,458 B2 | 3/2008 | Vaithilingam et al. | |
| 7,375,731 B2 | 5/2008 | Divakaran et al. | |
| 8,396,286 B1* | 3/2013 | Aradhye | G06K 9/66 382/159 |
| 8,805,653 B2* | 8/2014 | Huh | G06F 17/16 382/118 |
| 2005/0021499 A1 | 1/2005 | Bradley et al. | |
| 2005/0123053 A1* | 6/2005 | Cooper | G11B 27/28 375/240.24 |
| 2008/0159622 A1* | 7/2008 | Agnihotri | G06K 9/6232 382/157 |
| 2008/0267519 A1* | 10/2008 | Monga | G06K 9/522 382/248 |
| 2009/0141940 A1* | 6/2009 | Zhao | G06K 9/6255 382/103 |
| 2010/0092074 A1* | 4/2010 | Liang | G06K 9/00375 382/159 |
| 2011/0202527 A1 | 8/2011 | McCloskey et al. | |
| 2011/0216937 A1* | 9/2011 | Radhakrishnan | G06F 17/30799 382/100 |
| 2011/0268315 A1* | 11/2011 | Bauer | G06K 9/00744 382/100 |
| 2011/0299721 A1* | 12/2011 | He | G06K 9/6232 382/100 |
| 2012/0011119 A1 | 1/2012 | Baheti et al. | |
| 2013/0016908 A1 | 1/2013 | Xin et al. | |
| 2013/0113877 A1 | 5/2013 | Sukthankar et al. | |
| 2014/0037215 A1* | 2/2014 | Kumar | G06K 9/00718 382/197 |

OTHER PUBLICATIONS

Matthew Cooper and Jonathan Foote, "Summarizing Video using Non-Negative Similarity Matrix Factorization", IEEE Workshop on Multimedia Signal Processing, 2002, pp. 25-28.*
Filippo Pompili, Nicolas Gillis, P.-A. Absil, and Francois Glineur, "Two Algorithms for Orthogonal Nonnegative Matrix Factorization with Application to Clustering", arXiv:1201.0901v2, Feb. 2014, pp. 1-17.*
H. Kim and H. Park, "Sparse non-negative matrix factorizations for clustering," Bioinformatics, vol. 23, No. 12, pp. 1495-1502, Jun. 2007.
Chris Ding, Tao Li, Wei Peng, Haesun Park, "Orthogonal Nonnegative Matrix Tri-Factorizations for Clustering," Proc Int'l Conf. on Knowledge Discovery and Data Mining (KDD 2006), Aug. 2006.
Jegou, H. "Aggregating Local Image Descriptors into Compact Codes," Pattern Analysis and Machine Intelligence, IEEE Transactions on (vol. 34, Issue: 9). Dec. 13, 2011.

* cited by examiner

Projected Proximal-point Alternating Least Squares Procedure

1: Input $X$, factor rank $r$, $\rho$, maxiter
2: Output $\hat{L}, \hat{R}$
3: Initialize $k = 0, L_0 \in U_{[0,1]}, R_0 \in U_{[0,1]}$
4: while not converged and $k <$ maxiter do
5:     Update the compact descriptor $L$
6:     $\tilde{L} = \left(\rho L_k + X R_k^T\right)\left(\rho I_r + R_k R_k^T\right)^{-1}$
7:     $L_{k+1,i} = \tilde{L}_{+,i}/\|\tilde{L}_{+,i}\|_2$
8:     Update the binary selector $R$
9:     $\tilde{R} = \left(\rho I_r + L_k^T L_k\right)^{-1}\left(\rho R_k + L_{k+1}^T X\right)$
10:     $R_{k+1,j} = \text{Proj}_{E_r}(\tilde{R}_j), \forall j \in \{1,\ldots,n\}$
11:     $k = k + 1$
12: end while
13: $\hat{L} = L_k, \hat{R} = R_k$

*Fig. 3*

METHOD FOR EXTRACTING LOW-RANK DESCRIPTORS FROM IMAGES AND VIDEOS FOR QUERYING, CLASSIFICATION, AND OBJECT DETECTION

FIELD OF THE INVENTION

This invention relates generally to image processing, and more particularly to extracting descriptors from images and videos that can be used for quering, classification and object detection.

BACKGROUND OF THE INVENTION

The advent of inexpensive cameras and inexpensive storage has made it practical to collect images and video for storage in very large databases. For example, it is estimated that one popular social media provider stores about 80 billion images, and processes 600,000 images per second.

The commercial viability of such databases depends in large part on the availability of search and retrieval application. Thus, a great effort has been devoted to search and retrieval mechanisms for images. In general, such mechanisms rely on identifying points of interest in an image, often referred to as keypoints, and then extracting features from these points that remain accurate when subject to variations in translation, rotation, scaling and illumination.

Examples of such features include scale-invariant feature transform (SIFT), speeded-up robust features (SURF), binary robust invariant scalable keypoints (BRISK), fast retina keypoint (FREAK), histogram of oriented gradients (HoG), circular Fourier-HOG (CHOG), others.

To reduce the bandwidth and complexity of such applications, while preserving matching accuracy and speed, the features are often aggregated and summarized to more compact descriptors. Approaches for compacting the feature spaces include principal component analysis (PCA), linear discriminant analysis (LDA), boosting, spectral hashing, and the popular Bag-of-Features approach. The latter converts features to compact descriptors codewords) using cluster centers produced by means clustering.

The compact descriptors extracted from a query image or video can be compared to descriptors extracted from images in the database to determine similar images. There has, however, been much less work in developing efficient feature matching mechanisms for video queries.

To extend conventional image descriptors to derive video descriptors is not straightforward. One naïve method extracts image descriptors from each image in the video sequence, treating each image separately. That method fails to exploit the fact that features extracted from successive video images tend to be very similar, and describe similar keypoints, resulting in a very redundant representation. Furthermore, that method does not remove features that are not persistent from image to image, and probably does not describe the video sequence very well. Thus, simply collecting individual image descriptors is bandwidth-inefficient and significantly increase matching complexity.

A more efficient approach is to compress the descriptors derived from each video image, exploiting the motion of those descriptors through the video sequence. Those methods exploit powerful paradigms from video compression, such as Motion compensated prediction and rate-distortion optimization, to reduce the bit-rate of the transmitted descriptors. However, those methods do not address the problem of discovering a small set of descriptors that can represent a visually salient object.

SUMMARY OF THE INVENTION

The embodiments of the invention provide a method for extracting low-rank descriptors ala video acquired of a scene, wherein the video includes a sequence of images.

Therefore, it is an object of this invention to generate a low-rank descriptor that reduces the amount of information that is required to store representative descriptors of a video scene, while maintaining the discriminability relative to descriptors generated from different video scenes. Another object of this invention is to utilize the low-rank descriptors for querying, and retrieval of videos from a large database, and object detection.

In one embodiment of this invention, the low-rank descriptors are generated by extracting visual descriptors from a group of pictures (GoP) in a video, determining a low-rank descriptor representation of the video scene descriptors, determining a selection matrix that associates every extracted descriptor to a corresponding column in a low-rank descriptor.

Another embodiment of the invention extracts a low-rank descriptor from a large collection of video descriptors using non-negative matrix factorization (NMF), comprising a sequence of steps where a low-rank factor is first determined by non-negative least squares minimization, next a selection factor is determined by minimizing a proximal point least squares problem, and then keeping a largest entry in every column of the selection matrix and setting all other entries to zero. The sequence of steps is repeated until the low-rank factor and the selection matrix do not change.

Another embodiment of the invention classifies video scenes by using the low-rank descriptors, comprising determining a low-rank descriptor of a query video, determining a low-rank descriptor of each of many videos available in a database, determining the correlation coefficient between the low-rank descriptor of the query video and the low-rank descriptor of each of the database videos, assigning the query video to the database video with a low-rank descriptor that has a largest correlation coefficient with the low-rank descriptor of the query video.

Another embodiment of the invention detects objects in a video, comprising acquiring, a video of an object, subtracting the background pixels from the video to keep only pixels representing the object, extracting visual descriptors from every image containing only the object, determining a low-rank descriptor from the visual descriptors extracted from the background subtracted video, determining the correlation coefficient between the low-rank descriptor and visual descriptors belonging to several videos available in a database, assigning the object to the video in the database that has a visual descriptor with a highest correlation coefficient relative to the low-rank descriptor of the query object.

The embodiments consider the problem of extracting descriptors that represent visually salient portions of a video sequence. Most state-of-the-art schemes generate video descriptors by extracting features, e.g., SIFT or SURF or other keypoint-based features, from individual video images. Those approaches are wasteful in scenarios that impose constraints on storage, communication overhead and on the allowable computational complexity for video querying. More important, the descriptors obtained by that approach generally do not provide semantic clues about the video content.

Therefore, the embodiments provide novel feature-agnostic approaches for efficient retrieval of similar video content. The efficiency and accuracy of retrieval is evaluated relative to applying k-means clustering to image features extracted from video images. The embodiments also propose a novel approach in which the extraction of low-rank video descriptors is cast as a non-negative matrix factorization (NMF) problem.

BRIEF DESCRIPTION OF THE DRAWINGS

FIG. 3 is a block, diagram of a projected proximal-point alternating least squares minimization procedure used by embodiments of the invention.

DETAILED DESCRIPTION OF THE PREFERRED EMBODIMENTS

The embodiments of our invention provide a method for extracting low-rank descriptors of a video acquired of a scene, wherein the video includes a sequence of images. The low-rank descriptors of visual scenes allow us to reduce the amount of metadata that is compressed and stored with the video bitstream, while maintaining a discriminative representation of the scene content. Our framework assumes that local scene descriptors, such as SIFT or HoG features, are extracted from every video image in a group of pictures (GoP). The descriptors are stacked to form a matrix X of size m×N where m is a length of the feature vector and N is a total number of descriptors extracted from the GoP. In many situations, the number of descriptors can reach several hundred features per image.

For the purpose of this description, the rank of an individual descriptor is 1. By aggregating descriptors into the matrix X, the rank is a minimum between 128, for SIFT, and a number of columns in the matrix X. Therefore, any compact descriptor with a rank less than 128 is considered to be low-rank.

Figure 1:
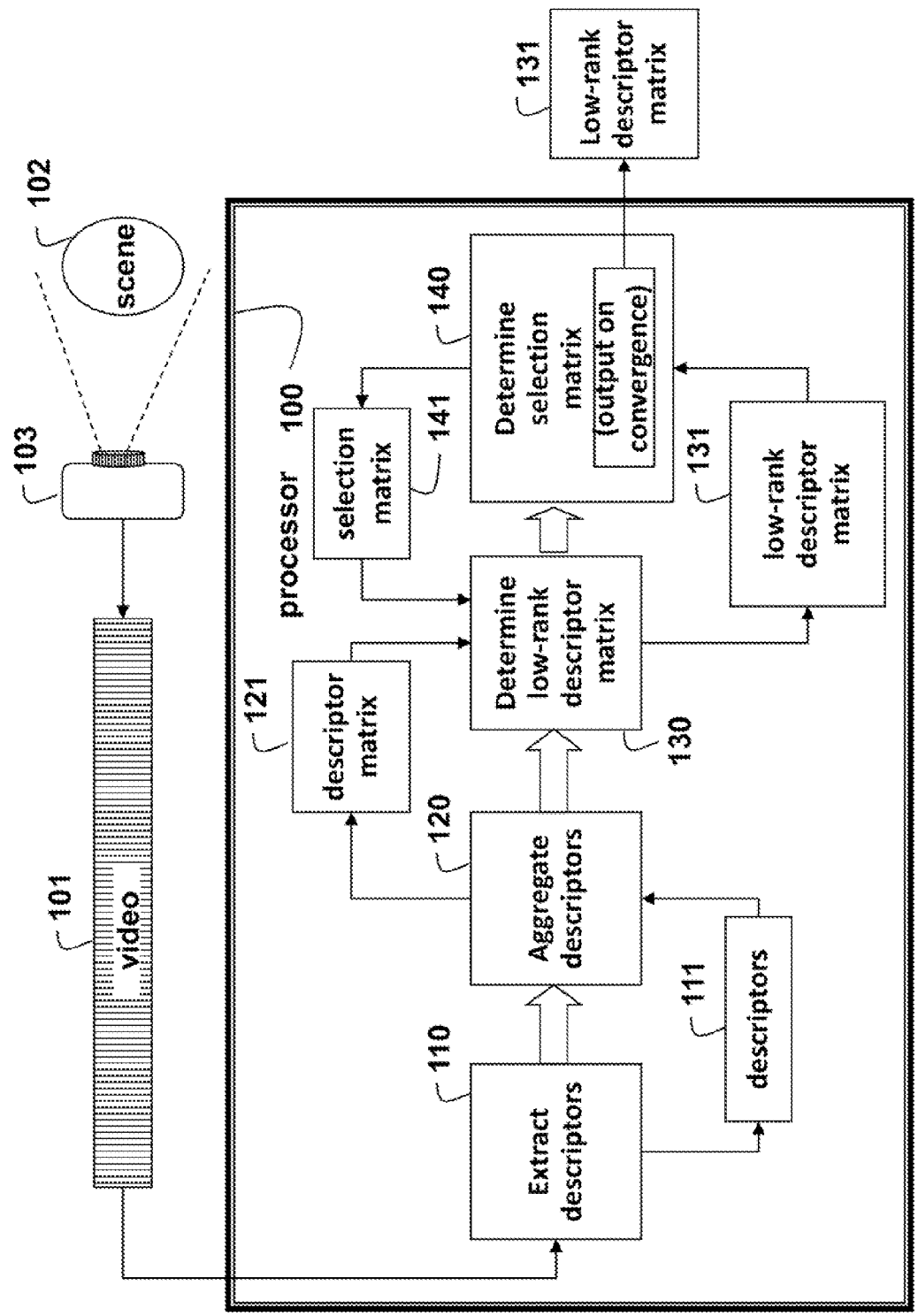
FIG. 1 is a flow diagram of a method for extracting descriptors from a video according to embodiment of the invention.

As shown in FIG. 1, the embodiments of the invention provide a method for extracting low-rank descriptors 131 of a video 101 acquired of a scene 102 by a camera 103. The video includes a sequence of images.

A set of descriptors 111 is extracted 110 for each image in the video. The sets of descriptors is aggregated 120 to form a descriptor matrix 121. A low-rank descriptor matrix 131 representation of the scene is determined 130. Then, a selection matrix 141 that associates every extracted descriptor to a corresponding column in the low-rank descriptor is also determined. The steps 130 and 140 are iterated until convergence, when the low-rank descriptor matrix is output. The steps of the method can be performed in a processor 100 connected to memory and input/output interfaces by busses as known in the art.

Determining the Low-Rank Descriptor Using NMF

Matrix factorization is a technique used for determining low dimensional representations for high dimensional data. An m×N matrix X is factored into two components L and R such that their product closely approximates the original matrix $$X \approx LR. \tag{1}$$

In the special case where the matrix and its factors have non-negative entries, the problem is known as non-negative matrix factorization (NMF). NMF has gained popularity in machine learning and data mining, for example searching videos stored in a very large database.

Several NMF formulations exist, with variations on the approximation cost matrix, the structure imposed on the non-negative factors, applications, and the computational methods to achieve the factorization, among others.

Of interest to the invention are NMF formulations used for clustering. Specifically, we consider sparse NMF and orthogonal NMF formulations. The orthogonal NMF problem is defined as $$\min_{L \geq 0, R \geq 0} \frac{1}{2} \|X - LR\|_F^2 \text{ s.t. } RR^T = I, \tag{2}$$

where T is a vector transpose operator, and I is an identity matrix. This formulation is equivalent to k-means clustering.

Alternatively, the sparse NMF problem relaxes the orthogonality constraint on R replacing R with an $L_{l_1}$ norm regularizer on the columns of R, and a smoothing Frobenius norm on L. The sparse NMF problem is explicitly defined as $$\min_{L \geq 0, R \geq 0} \frac{1}{2} \|X - LR\|_F^2 + \alpha \|L\|_F^2 + \beta \sum_{i=1}^{N} \|R(:,i)\|_1^2, \tag{3}$$

where α and β are problem specific regularization parameters.

Note that NMF problems are non-convex. Procedures that solve these problems generally do not have global optimality guarantees. Therefore, different procedures that solve the same problem can arrive at different solutions. In what follows, we develop a procedure that addresses the orthogonal NMF problem, and demonstrate that the solutions produced by our procedure has better classification properties compared to k-means and sparse NMF.

Low-Rank Scene Descriptors

Low-rank descriptors of visual scenes enable us to reduce the amount of metadata that is compressed and stored with a video bitstream, while maintaining a discriminative representation of the scene content. Our framework assumes that local scene descriptors, such as SIFT or HoG features are extracted from every video image in a group of pictures (GoP). The descriptors are stacked to form the descriptor matrix X 121 of size m×N, where m is a length of the feature vector and N is a total number of descriptors extracted from the GoP.

In many situations, the number of descriptors N can reach several hundred features per image. Therefore, it is imperative that these descriptors be encoded in a compact manner. In this section, we develop a framework for extracting a low-rank descriptor that represents the salient visual information in a video scene.

Determining the Low-Rank Descriptor Using NMF

We observe that visually salient objects in a scene maintain a nearly stationary descriptor representation throughout the GoP. Therefore, we formulate the problem of determining a low-rank, descriptor of a video scene as that of determining a low dimensional representation of the matrix X. Ideally, the set of feature vectors that represent the salient objects in a GoP can be encoded using a matrix $L \in R^{m \times r}$, where r≪N represents the number of descriptors that distinctly represent the salient object.

Figure 2:
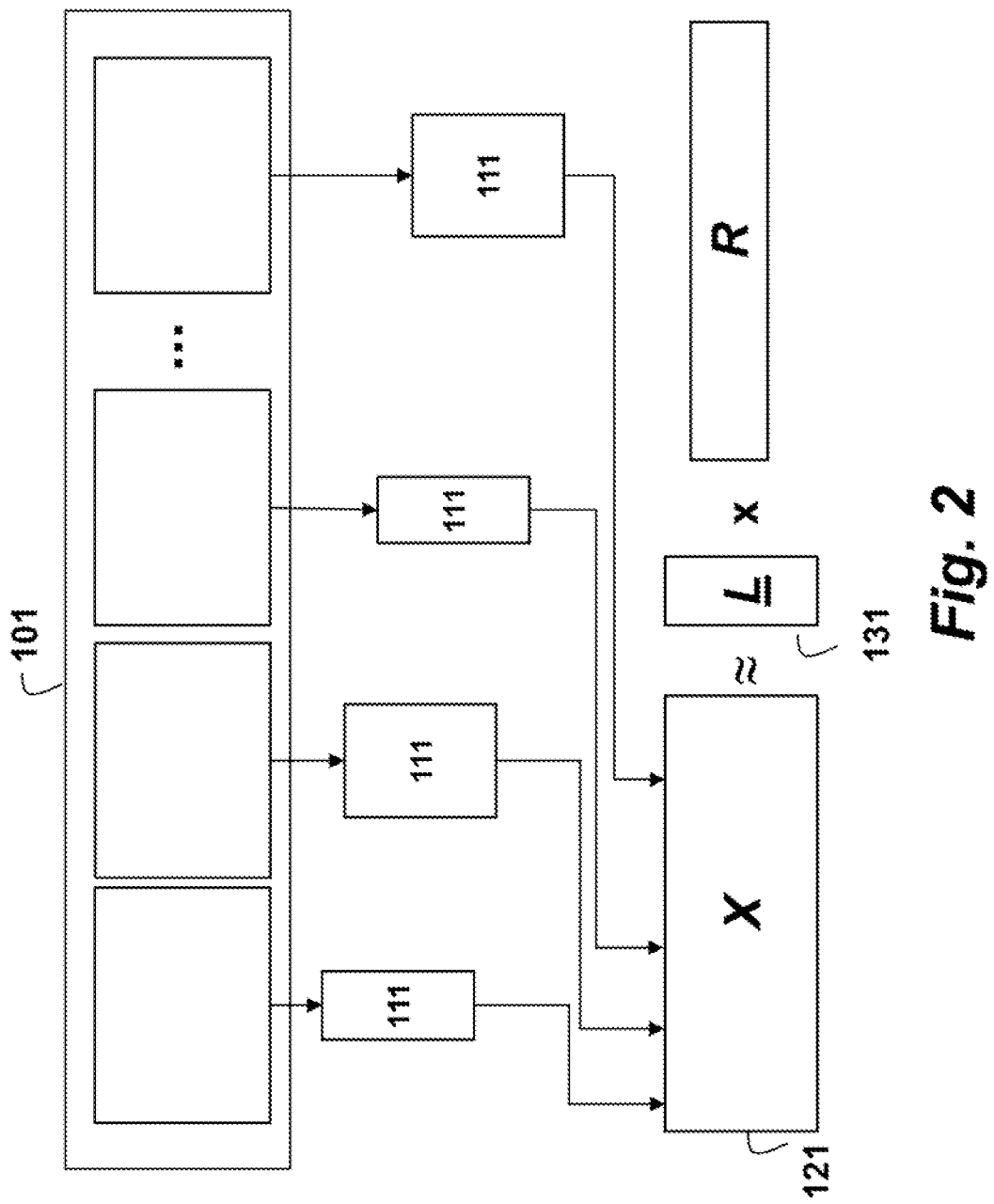
FIG. 2 is a schematic of the method for extracting descriptors from a video according to embodiment of the invention.

FIG. 2 schematically shows the process of extracting SIFT features from a video GoP, and determining the low-rank representation L 131 and the binary selection matrix R 141. In the case of SIFT descriptors, the columns in the matrix X 121 are non-negative unit norm vectors. Therefore, we pose the problem of determining $\hat{L}$ as the following non-negative matrix factorization (NMF) problem $$\min_{\substack{L \in R_+^{m \times r} \\ R \in R_+^{r \times N}}} \frac{1}{2} \|X - LR\|_F^2 \quad (4)$$

$$\text{subject to} \begin{cases} \|L_i\|_2 = 1, \forall i \in \{1, \ldots r\} \\ \|R_j\|_0 = 1, \forall j \in \{1, \ldots, N\} \end{cases},$$

where $L_i$ and $R_j$ are the columns of the matrices L and R indexed by i and j, respectively, and $\mathfrak{R}_+$ is the positive orthant.

The NMF formulation in equation (4) functions similar to a k-means classifier and ensures that for a large enough r, the columns of $\hat{L}$ contain the cluster centers of dominant features in the matrix X, while the selection matrix $\hat{R}$ selects the cluster centers in $\hat{L}$ that best match the data.

As shown in FIG. 3, we provide a projected proximal-point alternating least squares minimization procedure to solve equation (4) In every iteration k of the procedure, the factors $L_k$ and $R_k$ are updated by determining a minimizer of the proximal least squares terms $$\hat{L} = \arg\min_{L \in R^{m \times r}} \frac{1}{2} \|X - LR_k\|_F^2 + \frac{\rho}{2} \|L - L_k\|_F^2, \quad (5)$$

$$\hat{R} = \arg\min_{R \in R^{r \times N}} \frac{1}{2} \|X - L_k R\|_F^2 + \frac{\rho}{2} \|R - R_k\|_F^2,$$

where ρ is a parameter that controls smoothness of the problem.

The columns of $\hat{L}$ are then projected onto the non-negative $L_{l_2}$ unit sphere, while the columns of $\hat{R}$ are projected onto the admissible set of standard basis vectors $E_r := \{e_i \in \mathfrak{R}^r : e(i) = 1, \text{ and } 0 \text{ otherwise}, i \in \{1, \ldots r\}\}$ by setting the largest non-negative entry in each column to one and the remaining entries to zero. Note that $\hat{L}$ and $\hat{R}$ admit closed form solutions as shown in FIG. 3. The factors $L_0$ and $R_0$ are initialized with independent identically distributed uniform random entries. The iterates $\hat{L}$ and $\hat{R}$ are determined by solving proximal-point alternating least squares functionals and then keeping only the positive entries $\hat{L}+$ and $\hat{R}+$ in the factors. The factors are projected onto the unit column norm ball for $\hat{L}$, and onto the binary selector set $E_r$ for $\hat{R}$.

Classification Using Low-Rank Descriptors

Figure 4:
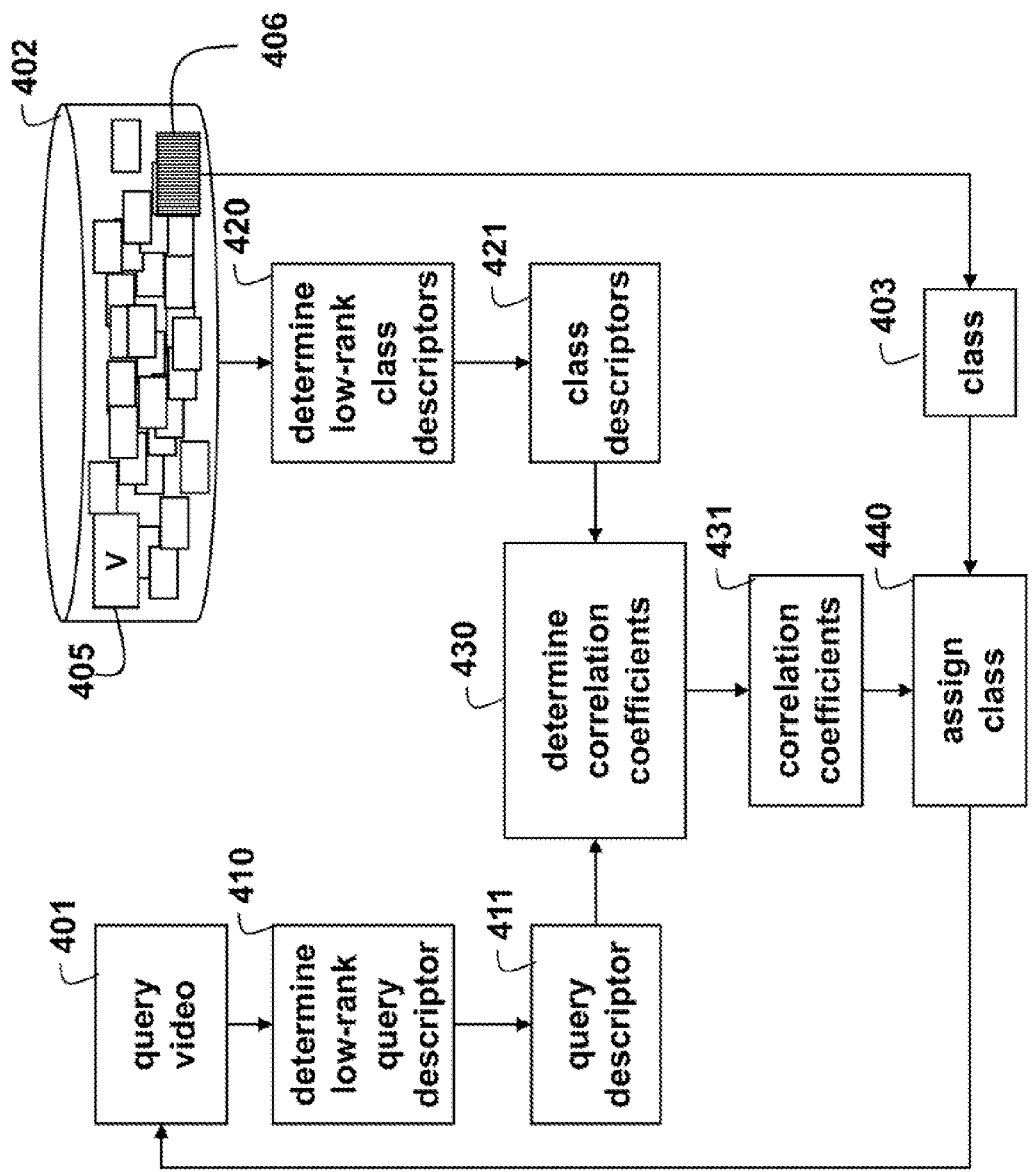
FIG. 4 is a block diagram of a method for classifying a video according to embodiment of the invention.

As shown in FIG. 4, we can use the low-rank descriptor to classify a query video. By extracting low-rank descriptors $\hat{L}$ from video GoPs, we can reduce the problem of matching all feature vectors in a query GoP with the features of already classified videos in a database to that of matching the low-rank descriptors between the query GoP and the GoPs in the database.

Suppose that the query video as well as the database videos are partitioned into GoPs of size n video images. Let $\hat{L}Q$ denote the GoP's low-rank query descriptor, and $\hat{L}_D(g)$ denote the low-rank class descriptors of GoPs in the database indexed by g. A database GoP indexed by $\hat{g}$ matches the query GoP if it has a largest correlation coefficient relative to $\hat{L}Q$, i.e., $$\hat{g} = \arg\max_{g} \|\hat{L}_Q^T \hat{L}_D(g)\|_\infty, \quad (6)$$

where an infinity norm $\|.\|_\infty$ is applied after vectorizing the matrix product $\hat{L}^T{}_Q \hat{L}_D(g)$. Consequently, the matching GoP in the database is the one whose low-rank descriptor correlates best with the query descriptor, and the class of the matching GoP can be assigned to the query GoP.

FIG. 4 shows the classification method according to embodiments of the invention. A low-rank query descriptor 411 is determined 410 from a query video 401. A low-rank class descriptor 421 is determined 420 for each of the videos (V) 405 in a database 402, wherein each video in the database is associated with a class. A correlation coefficient 431 between the low-rank query descriptor and each low-rank class descriptors is determined 430. The class 403 of the video 406 in the database with a largest correlation coefficient is assigned 440 to the query video.

Video Retrieval Using Low-Rank Descriptors

The classification method described above can also be used for video retrieval. In this case, the retrieval method obtains videos from the database with correlation coefficients larger than a predetermined threshold.

Object Detection Using Low-Rank Descriptors

We can also use the low-rank descriptor to detect an object in a video. This process is similar to what is shown in FIG. 4. In this case, instead of the query video a foreground video is used. The foreground video is obtained by subtracting background pixels from each image in the video. This process is also applied to the video in the database.

Thus, when the scene includes a specific object, background pixels are subtracted from each image in the video to obtain the foreground video. A low-rank object descriptor is determined of the foreground video. A low-rank object class descriptor of each video in a database is also determined, wherein each video in the database is associated with an object class. The object class of the video in the database with a largest correlation coefficient is assigned to the foreground video.

EFFECT OF THE INVENTION

Our experimental data demonstrate that low dimensional clustering of visual features according to embodiments of the invention can significantly reduce the memory requirements for representing visually salient objects in a video scene.

A rank 30 descriptor achieves storage reductions that exceed 97% and average at 99%. Moreover, the low-rank descriptors maintain their discriminability with well over 90% matching accuracy despite the significant compression.

Procedurally, we demonstrate that our proposed orthogonal NMF (ONMF) method for determining low dimensional clusters is more discriminative than both k-means clustering and sparse NMF. Our approach is also more robust to variations in the number of clusters than k-means.

One striking observation is that while sparse NMF outperforms k-means for very low-rank representations, it quickly becomes unstable as the number of clusters, i.e., the rank of the factors, increases. We also note that: because all of the above mentioned clustering problems are non-convex, the solutions to these problems depend on the initialization.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for querying a database of videos, comprising:
   extracting a set of descriptors for each image in a video of a scene;
   aggregating the sets of descriptors for the video to form a descriptor matrix;
   determining a product of a low-rank descriptor matrix and a selection matrix using an orthogonal non-negative matrix factorization of the descriptor matrix, such that each column of the selection matrix has only one nonzero entry and associates a column in the descriptor matrix to a corresponding column in the low-rank descriptor matrix;
   wherein the factorization comprises:
      determining a low-rank factor by a non-negative least squares minimization; and
      determining a selection matrix factor by minimizing a proximal point least squares problem and retaining a largest entry in every column of the selection matrix and setting all other entries to zero;
   and
   querying the database of videos including at least one video using the low-rank descriptor matrix to produce a search result, wherein the steps are performed in a processor.

2. The method of claim 1, further comprising:
   extracting features from each image in the video; and
   aggregating the features to form the set of descriptors for each image in the video.

3. The method of claim 2, wherein the features are extracted using a scale-invariant feature transform.

4. The method of claim 1, wherein the set of descriptors for each image in the video are stacked to form a matrix X of size m×N, where m is a length of a feature vector and N is a total number of descriptors extracted from the video.

5. The method of claim 1, wherein the rank of the low-rank descriptor matrix is less than a length of a feature vector.

6. The method of claim 1, further comprising:
   determining a low-rank class descriptor of each video in the database, wherein each video in the database is associated with a class;
   determining a correlation coefficient between the low-rank descriptor matrix and each low-rank class descriptor; and
   assigning the class of the video in the database with a largest correlation coefficient to the video of the scene.

7. The method of claim 6, wherein each video is partitioned into a group of pictures, and the determining and assigning steps are applied to the group of pictures.

8. The method of claim 1, further comprising:
   determining a low-rank class descriptor of each video in the database;
   determining a correlation coefficient between the low-rank descriptor matrix and each low-rank class descriptor; and
   retrieving the videos in the database with a correlation coefficient larger than a predetermined threshold.

9. The method of claim 1, wherein the scene includes an object, and further comprising:
   subtracting background pixels from each image in the video to obtain a foreground video;
   determining a low-rank object descriptor of the foreground video;
   determining a low-rank object class descriptor of each video in the database, wherein each video in the database is associated with an object class;
   and assigning the object class of the video in the database with a largest correlation coefficient to the foreground video.

10. The method of claim 1, wherein the scene includes an object, and further comprising:
   subtracting background pixels from each image in the video to obtain a foreground video of the scene;
   determining a low-rank object descriptor of the foreground video of the scene;
   subtracting background pixels from each image of each video in the database to obtain foreground videos in the database;
   determining a low-rank object class descriptor of each foreground video in the database, wherein each video in the database is associated with an object class;
   and assigning the object class of the video in the database with a largest correlation coefficient to the foreground video of the scene.

* * * * *